US012617354B2

(12) United States Patent
Kawamoto

(10) Patent No.: US 12,617,354 B2
(45) Date of Patent: May 5, 2026

(54) BRACKET

(71) Applicant: SUMITOMO WIRING SYSTEMS, LTD., Mie (JP)

(72) Inventor: Yuichiro Kawamoto, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 278 days.

(21) Appl. No.: 18/280,646

(22) PCT Filed: Feb. 24, 2022

(86) PCT No.: PCT/JP2022/007519
§ 371 (c)(1),
(2) Date: Sep. 6, 2023

(87) PCT Pub. No.: WO2022/190875
PCT Pub. Date: Sep. 15, 2022

(65) Prior Publication Data
US 2024/0149804 A1 May 9, 2024

(30) Foreign Application Priority Data
Mar. 11, 2021 (JP) ................................. 2021-039081

(51) Int. Cl.
*B60R 16/02* (2006.01)
*H02G 3/30* (2006.01)

(52) U.S. Cl.
CPC ........... *B60R 16/0215* (2013.01); *H02G 3/30* (2013.01)

(58) Field of Classification Search
CPC ........... B60R 6/0215; B60R 6/02; H02G 3/30
See application file for complete search history.

(56) References Cited

U.S. PATENT DOCUMENTS

| 2012/0124815 A1 | 5/2012 | Mabuchi et al. | |
| 2017/0015199 A1* | 1/2017 | Shiba | B60K 6/40 |
| 2018/0105123 A1* | 4/2018 | Takahashi | H02G 3/32 |

FOREIGN PATENT DOCUMENTS

| JP | H02-023684 U1 | 2/1990 |
| JP | H08-085401 A | 4/1996 |
| JP | H11-062617 A | 3/1999 |
| JP | 2005-119342 A | 5/2005 |
| JP | 2007-253873 A | 10/2007 |
| JP | 2008-157428 A | 7/2008 |

OTHER PUBLICATIONS

International Search Report issued on Apr. 19, 2022 for WO 2022/190875 A1 (4 pages).

* cited by examiner

*Primary Examiner* — Paresh Paghadal
(74) *Attorney, Agent, or Firm* — Venjuris, P.C.

(57) ABSTRACT

A bracket (14) includes a first surface (18) and a second surface (19). The first surface (18) is to be attached to a metal panel (2) that forms at least a portion of a housing chamber (3) that accommodates a vibration source (4). The second surface (19) is positioned on the opposite side to the first surface (18), and comes into contact with a wire harness (8) routed inside the housing chamber (3), in order to guard the panel (2) from contact with the wire harness (8) when the wire harness (8) receives vibration of the vibration source (4).

10 Claims, 5 Drawing Sheets

BRACKET

CROSS REFERENCE TO RELATED APPLICATIONS

This application is a national phase of PCT application No. PCT/JP2022/007519, filed on 24 Feb. 2022, which claims priority from Japanese patent application No. 2021-039081, filed on 11 Mar. 2021, all of which are incorporated herein by reference.

TECHNICAL FIELD

The present invention relates to a bracket that suppresses the interference of a wire harness to a panel.

BACKGROUND

Heretofore, in vehicles, a wire harness that electrically connects onboard electrical components is mounted, but there is a concern that the wire harness will come into contact with a vehicle body panel due to vibration while the vehicle is travelling. Patent Document 1, for example, discloses a countermeasure to this. That is to say, Patent Document 1 discloses a technique in which an edge portion of a vehicle body panel and an electric wire bundle held by a clamp member are separated from each other with a specified distance or larger therebetween, and a distance at which the clamp member is mounted is set such that the vibration amplitude of the electric wire bundle when vibration is occurring is lower than a specified amplitude.

PRIOR ART DOCUMENT

Patent Document

Patent Document 1: JP 2012-115022 A

SUMMARY OF THE INVENTION

Problems to be Solved

Incidentally, Patent Document 1 discloses a technique for preventing a wire harness and a vehicle body panel from coming into contact with each other by adjusting the distance between members. For this reason, there has been a problem in that it is troublesome to set settings for distance adjustment. Thus, there has been a need to develop a technique that makes it possible to prevent the wire harness and the panel from coming into contact with each other, with a simple configuration.

An object of the present disclosure is to provide a bracket that can suppress the interference of a wire harness to a panel, with a simple configuration.

Means to Solve the Problem

A bracket that can solve the aforementioned issue is configured to be attached to a metal panel that forms at least a portion of a housing chamber, and includes: a first surface that is to be attached to the panel, and a second surface that is positioned on the opposite side to the first surface, and comes into contact with a wire harness routed inside the housing chamber in order to guard the panel from contact with the wire harness.

Effect of the Invention

According to the present disclosure, it is possible to suppress the interference of a wire harness to a panel, with a simple configuration.

DETAILED DESCRIPTION TO EXECUTE THE INVENTION

Figure 1:
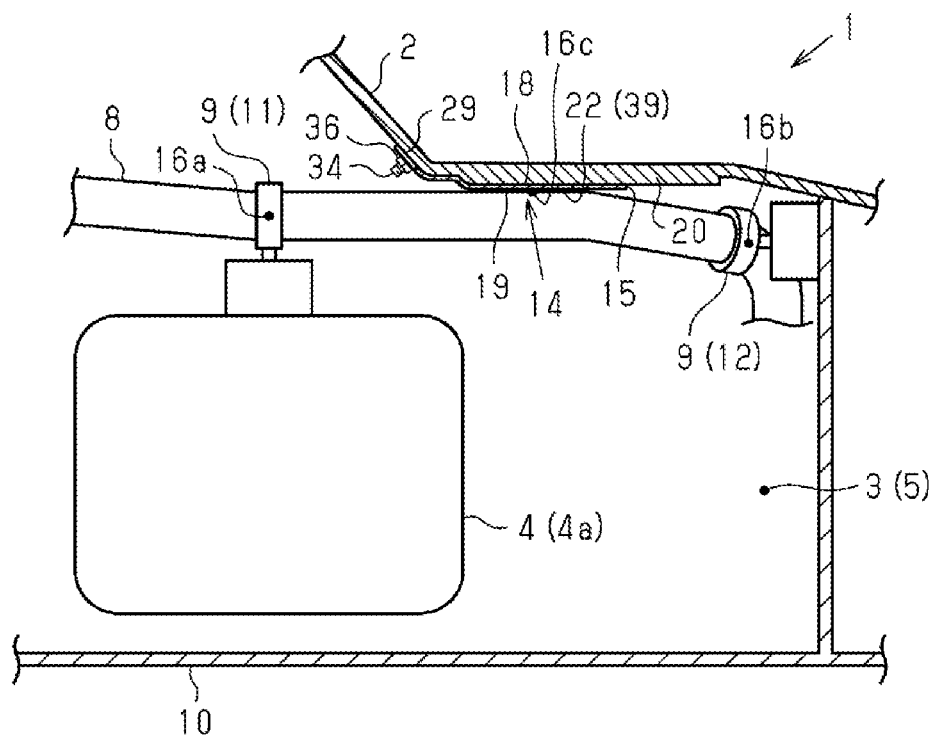
FIG. 1 is a schematic diagram showing an internal configuration of an engine room.

First, embodiments of the present disclosure will be listed and described.

[1] A bracket according to the present disclosure is configured to be attached to a metal panel that forms at least a portion of a housing chamber, the bracket including: a first surface that is to be attached to the panel, and a second surface that is positioned on an opposite side to the first surface, and serves as a guard surface that comes into contact with a wire harness routed inside the housing chamber, in order to guard the panel from contact with the wire harness.

According to this configuration, the bracket is attached to the metal panel such that the wire harness inside the housing chamber precedingly comes into contact with this bracket. For this reason, a situation is unlikely to occur in which the wire harness collides with the panel when vibration occurs, and thus the panel is unlikely to be bruised, etc. By simply attaching the bracket to the panel, it is possible to suppress the interference of the wire harness to the panel. Thus, with a simple configuration, it is possible to suppress the interference of the wire harness to the panel.

[2] The bracket includes a notch portion that exposes a stamping surface provided on the panel when the bracket is attached to the panel. According to this configuration, when the bracket is attached to the panel, it is possible to visually recognize the stamping surface of the panel through the notch portion.

[3] The bracket includes a plurality of receiving surfaces that support the wire harness such that the wire harness crosses the notch portion. According to this configuration, when the notch portion is provided in order to expose the stamping surface, the wire harness can be tightly supported by the plurality of receiving surfaces, which can be end surfaces of the notch portion, for example.

[4] The receiving surfaces include a first receiving surface that comes into contact with one side surface of the wire harness, and a second receiving surface that comes into contact with another side surface of the wire harness. According to this configuration, the wire harness can be tightly supported by the two surfaces.

[5] The bracket includes a bracket body. The first receiving surface and the second receiving surface extend in a plane direction of the bracket body so as to be orthogonal to each other. According to this configuration, for example, the wire harness whose routing path extends in an oblique projection can be efficiently brought into contact with the bracket.

[6] The bracket includes a fixing portion that is a fixing location to the panel, and is primarily attached to the panel. According to this configuration, when the bracket is attached to the panel, the bracket can be tightly fixed to the panel using the fixing portion.

[7] The bracket includes a tolerance absorption attachment portion that enables the bracket to be fixed to the panel while absorbing tolerance of attachment to the panel. According to this configuration, when the bracket is attached to the panel, the attachment position is flexible, and thus it is possible to improve an operation during attachment.

[8] At least the second surface of the bracket is made of a resin. According to this configuration, it is possible to reduce the friction resistance of the second surface of the bracket, and thus it is possible to cause the wire harness in contact with the second surface to easily slide. Thus, a situation can be made unlikely to occur in which the wire harness collides with the second surface of the bracket when vibration occurs. In other words, it is possible to reduce (mitigate) the impact.

[9] The wire harness is fixed to both a vibration source disposed in the housing chamber and a frame that constitutes the housing chamber, comes into contact with the wire harness, at an intermediate position between a first fixing position that is a fixing location to the vibration source and a second fixing position that is a fixing position to the frame. According to this configuration, even when the vibration source vibrates and the wire harness vibrates in conjunction with the vibration, the wire harness can be supported by the bracket. Thus, there is no need to bring the wire harness into contact with the panel.

Detailed Embodiments of Present Disclosure

A specific example of a bracket according to the present disclosure will be described below with reference to the drawings. Note that the present invention is not limited to these examples, but is defined by the claims and intended to include all modifications within the meaning and scope equivalent to the claims. In the drawings, part of a structure may be exaggerated or simplified for convenience of explanation. In addition, the dimensional ratio of each part may differ from the actual dimensional ratio of the part.

As shown in FIG. 1, a vehicle 1 includes a housing chamber 3 that has a metal panel 2 serving as a wall surface. The housing chamber 3 is an engine room 5 that accommodates a vibration source 4 (in this example, an engine 4a) of the vehicle 1, for example. The housing chamber 3 is disposed at a front portion of the vehicle body, for example, and is open to the outside when the hood of the vehicle 1 is opened.

The housing chamber 3 accommodates a wire harness 8 that electrically connects electrical components of the vehicle 1. The wire harness 8 includes one or more electric wires. The wire harness 8 is attached and fixed to the vehicle 1 via a plurality of attachments 9, for example. The attachments 9 include a first attachment 11 for fixing the wire harness 8 to the engine 4a and a second attachment 12 for fixing the wire harness 8 to a frame 10, for example. An attachment 9 can be a clip, for example.

Figure 2:
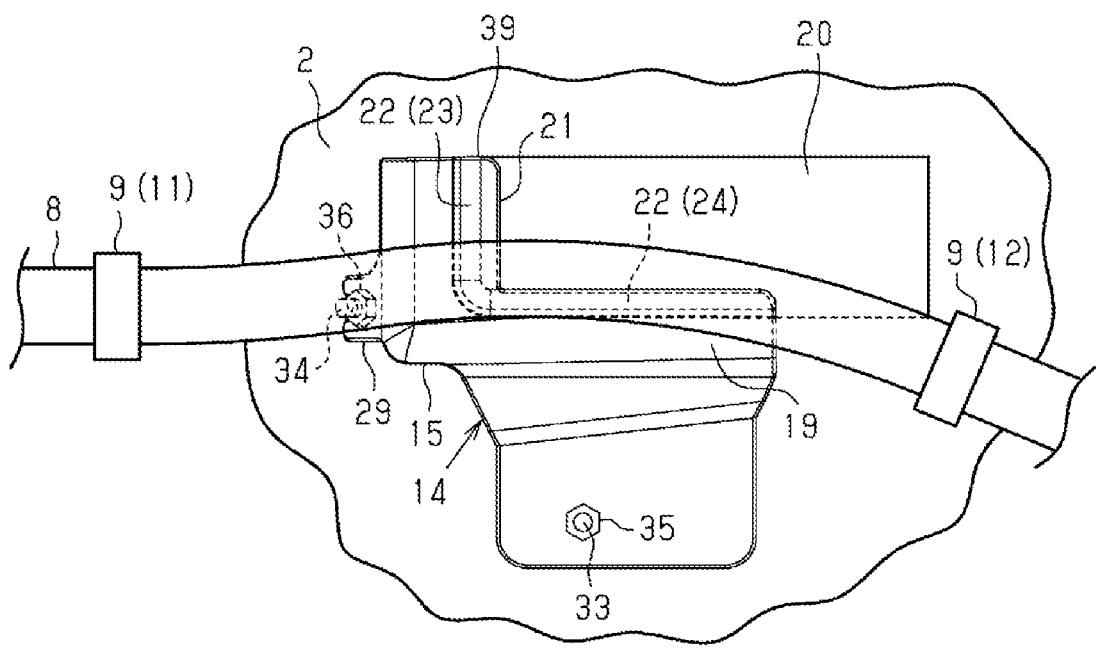
FIG. 2 is a front view showing a wire harness that comes into contact with a bracket.

As shown in FIGS. 1 and 2, a bracket 14 that keeps the wire harness 8 from coming into contact with the panel 2 is attached to the panel 2. The bracket 14 is a component for suppressing the interference of the wire harness 8 to the panel 2 even when the engine 4a or the vehicle body (the frame 10) vibrates, by intervening between the panel 2 and the wire harness 8. The bracket 14 can be attached at a predetermined attachment position of the panel 2 such that the wire harness 8 disposed in the housing chamber 3 comes into contact with the bracket 14 before the panel 2 (preceding contact). Note that the frame 10 can be a vehicle body frame, for example.

As shown in FIG. 1, when a fixing location where the engine 4a and the wire harness 8 are fixed to each other is referred to as a first fixing position 16a, and a fixing location where the wire harness 8 and the frame 10 are fixed to each other is referred to as a second fixing position 16b, the bracket 14 comes into contact with the wire harness 8 at an intermediate position 16c between the first fixing position 16a and the second fixing position 16b. That is to say, the wire harness 8 precedingly comes into contact with the bracket 14, at the intermediate position 16c between the first fixing position 16a and the second fixing position 16b. The intermediate position 16c is not necessarily limited to a central portion as long as it is between the first fixing position 16a and the second fixing position 16b, and the intermediate position 16c may be a position other than a central position.

Figure 3:
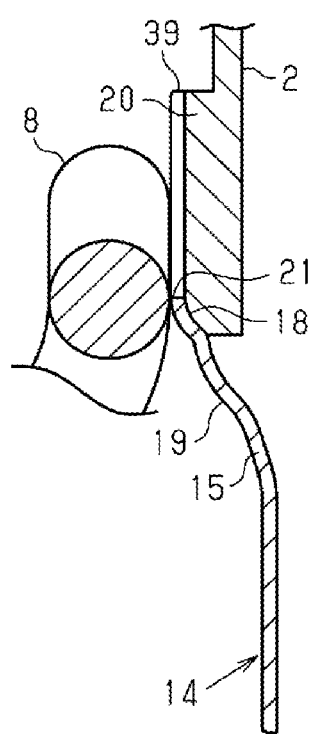
FIG. 3 is a cross-sectional view of the wire harness and the bracket.

As shown in FIG. 3, in a state of being attached to the vehicle 1, the wire harness 8 precedingly comes into contact with the bracket 14. Preceding contact refers to a state where, for example, the wire harness 8 is constantly in contact with the bracket 14, in an attached state. A bracket body 15 of the bracket 14 comes into contact with the wire harness 8, for example. Accordingly, when the engine 4a vibrates, or even when the vehicle body (the frame 10) vibrates while the vehicle is travelling, the wire harness 8 does not come into direct contact with the metal panel 2.

The bracket 14 is made of a resin, for example. The material of the bracket 14 can be polypropylene, for example. A friction coefficient μ of the bracket 14 is 0.3, for example. The friction coefficient μ of the metal panel 2 is 0.5 to 0.6, for example. The resin bracket 14 has a smaller friction coefficient μ than that of the metal panel 2. An attachment position of the bracket 14 is determined in advance such that the wire harness 8 precedingly comes into contact with the bracket 14 that has a smaller friction coefficient μ, not the panel 2 that has a larger friction coefficient μ.

Figure 4:
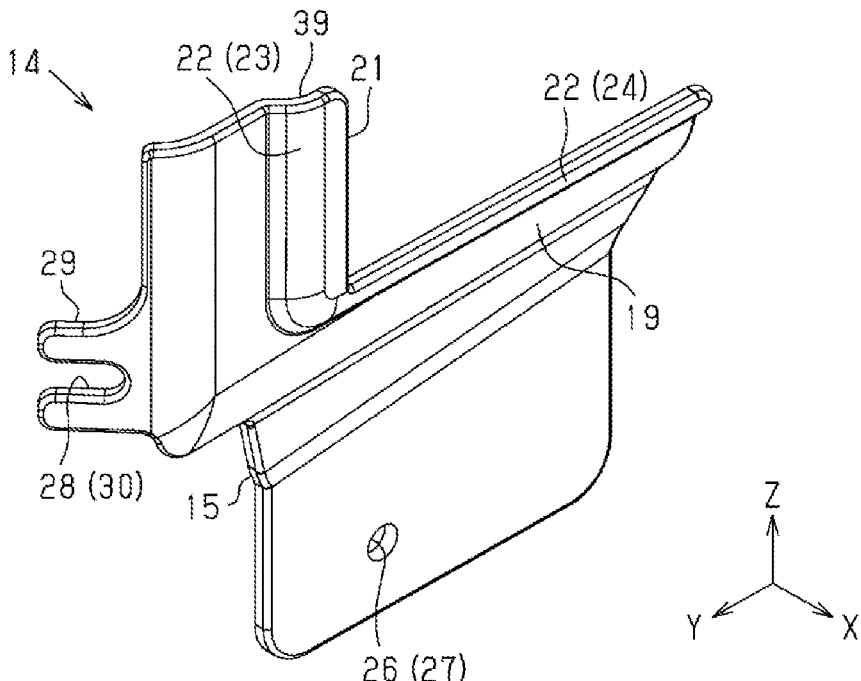
FIG. 4 is a perspective view of the bracket.
Figure 5:
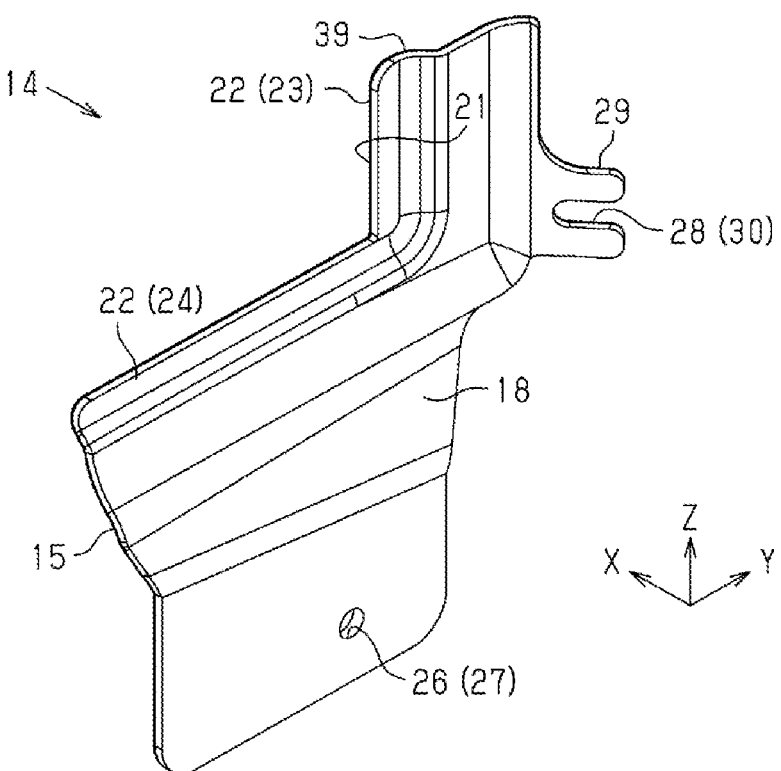
FIG. 5 is a perspective view of the bracket.
Figure 6:
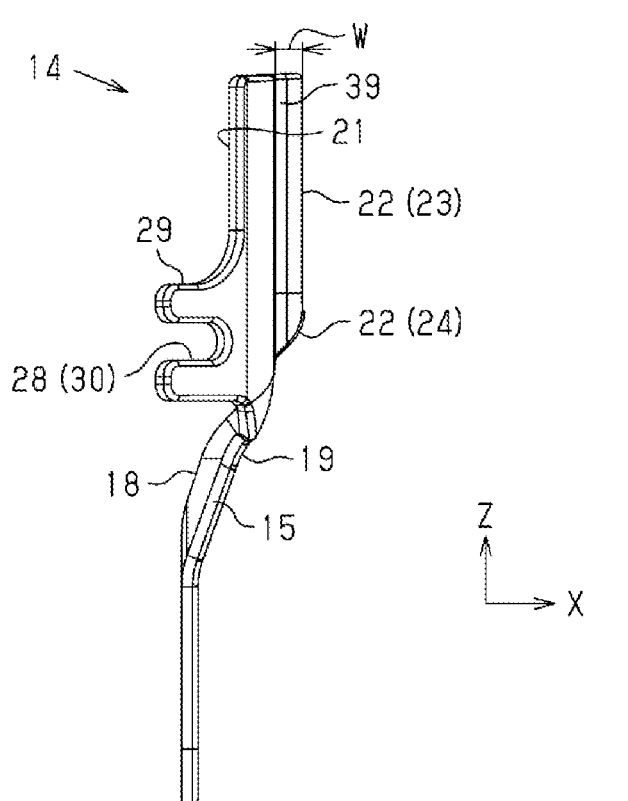
FIG. 6 is a side view of the bracket.

As shown in FIGS. 4 to 6, the bracket 14 includes a first surface 18 that is attached to the panel 2, and a second surface 19 that is an opposite surface to the first surface 18. The second surface 19 serves as a guard surface that comes into contact with the wire harness 8, which is routed inside the housing chamber 3 that has the panel 2 as a side surface, in order to guard the panel 2 from contact with the wire harness 8. At least a portion of the first surface 18 of the bracket 14 comes into contact with the panel 2, and at least a portion the second surface 19 comes into contact with the wire harness 8. At least the second surface 19 of the bracket 14 is preferably made of a resin.

The bracket 14 includes a notch portion 21 that exposes a stamping surface 20 provided on the panel 2. The notch portion 21 is formed by notching or removing a portion of the bracket body 15. The stamping surface 20 is a display section on which vehicle body specific information such as a vehicle body number is written. The stamping surface 20 is preferably a section of the panel 2 that protrudes further than other locations by a predetermined amount.

The bracket 14 includes a plurality of receiving surfaces 22 that support the wire harness 8 such that the wire harness 8 crosses the notch portion 21. The receiving surfaces 22 are predetermined sections of the second surface 19 of the bracket body 15 that come into contact with the wire harness 8, for example. The receiving surfaces 22 include a first receiving surface 23 that comes into contact with one side surface of the wire harness 8, and a second receiving surface 24 that comes into contact with another side surface of the wire harness 8, for example. The first receiving surface 23 supports a section of the wire harness 8 that is close to the first attachment 11. The second receiving surface 24 supports a section of the wire harness 8 that is close to the second attachment 12. The bracket 14 is formed substantially in an L-shape. That is to say, the first receiving surface 23 and the second receiving surface 24 extend in the plane direction (the Y-Z axis plane in FIG. 4, etc.) of the bracket body 15 so as to be orthogonal to each other.

The bracket 14 includes a fixing portion 26 that is a fixing location to the panel 2. The fixing portion 26 is preferably a hole 27 shaped as a perfect circle and provided in the bracket body 15, for example. The bracket 14 includes a tolerance absorption attachment portion 28 as a fixing location that is different from the above fixing portion 26 to the panel 2. The tolerance absorption attachment portion 28 is preferably a long hole-shaped notch groove 30 formed by notching a protruding piece 29 positioned at an edge portion of the bracket body 15, for example.

Figure 7:
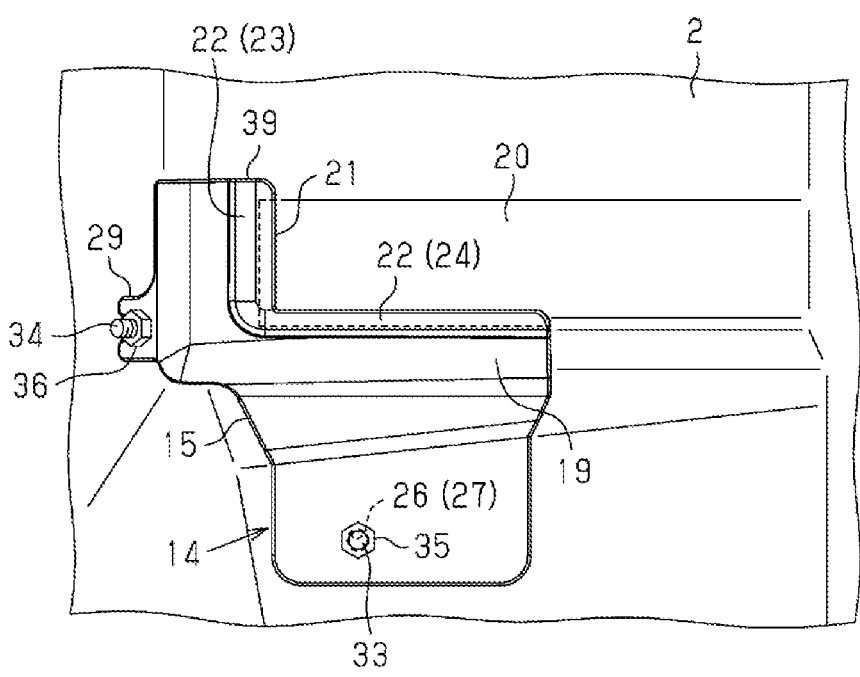
FIG. 7 is a front view showing a state of attachment of the bracket to a panel.

As shown in FIG. 7, the bracket 14 is attached and fixed to the panel 2 via the fixing portion 26 and the tolerance absorption attachment portion 28. A screw shaft 33 of the panel 2 is inserted into the hole 27, and another screw shaft 34 of the panel 2 is inserted into the long hole-shaped notch groove 30, for example. At this time, by adjusting the positional relation between the long hole-shaped notch groove 30 and the screw shaft 34, the bracket 14 is positioned relative to the panel 2. On the other hand, the fixing portion 26 has a structure in which the screw shaft 33 is inserted into and fixed to the hole 27 shaped as a perfect circle, and thus it can be said that the fixing portion 26 has a structure of being primarily attached to the panel 2. Then, by screwing a bolt 35 to a leading end of the screw shaft 33, and screwing a bolt 36 to a leading end of the screw shaft 34, the bracket 14 is fixed to the panel 2.

The bracket 14 includes an edge portion 39 that is placed on an edge part of the panel 2 when the bracket 14 attached to the panel 2. The edge portion 39 is positioned along a side of the notch portion 21. In addition, the edge portion 39 is preferably formed such that a protruding amount W (see FIG. 6) serving as a height thereof corresponds to a protruding amount of the panel 2. The wire harness 8 precedingly comes into contact with an internal end surface of the edge portion 39 or internal end surfaces serving as the first receiving surface 23 and the second receiving surface 24, for example.

Next, the functions of the bracket 14 according to the present embodiment will be described.

Figure 8:
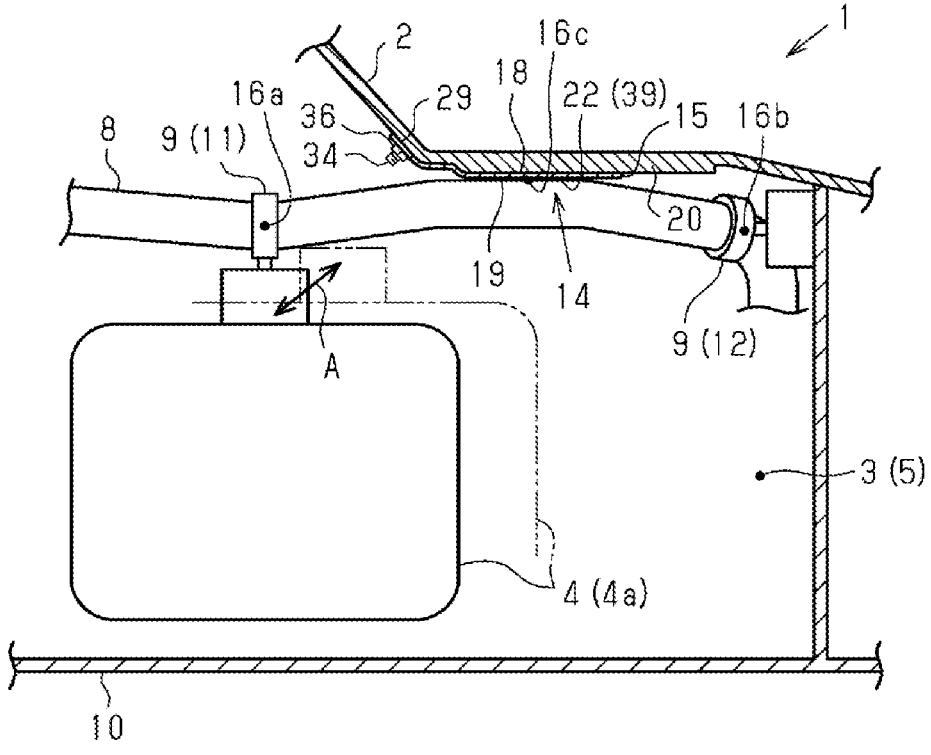
FIG. 8 is a schematic diagram showing a state where an engine is vibrating.

As shown in FIG. 8, the bracket 14 is attached to the metal panel 2 that is a wall surface of the engine room 5, and the wire harness 8 in the engine room 5 is precedingly brought into contact with the bracket 14. That is to say, the wire harness 8 inside the engine room 5 is bought into contact with the bracket 14 attached to the panel 2 in advance, and is kept in this state.

Here, assume that the engine 4a vibrates when the engine 4a is running. FIG. 8 shows an example where the engine 4a vibrates in the arrow A direction. When the engine 4a vibrates, the wire harness 8 also vibrates in conjunction with movement of the engine 4a since the wire harness 8 is attached to the engine 4a via the first attachment 11. If the wire harness 8 vibrates, there is the possibility that the wire harness 8 will come into contact with the panel 2.

Figure 9:
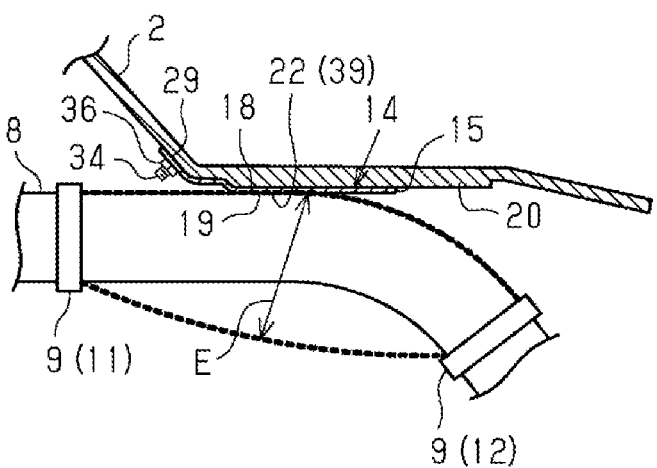
FIG. 9 is an explanatory diagram showing a movable range of the wire harness.

As shown in FIG. 9, the wire harness 8 comes into contact with the bracket 14 attached to the panel 2. Compared with a comparative example in which the bracket 14 is not attached to the panel 2, the bracket 14 can reduce the maximum amplitude or the maximum movement amount E of the harness 8. Even when, for example, the wire harness 8 vibrates or moves in response to vibration of the engine 4a, it is possible to prevent or keep the wire harness 8 from coming into contact with a coated surface and the stamping surface 20 of the panel 2. Accordingly, it is possible to prevent or reduce damage to the coated surface of the panel 2 and wear of the stamping surface 20 due to contact with the wire harness 8. It is possible to prevent or reduce rust and corrosion of the panel 2. In addition, it is possible to prevent or keep the vehicle body specific information (for example, the vehicle body number) on the stamping surface 20 from being unable to be visually recognized.

With the bracket 14 according to the above embodiment, the following effects can be achieved.

(1) The bracket 14 is attached to the metal panel 2 that defines the housing chamber 3. The bracket 14 includes the first surface 18 and the second surface 19. The first surface 18 is attached to the panel 2. The second surface 19 is positioned on the opposite side to the first surface 18, and serves as a guard surface that comes into contact with the wire harness 8 routed inside the housing chamber 3, in order to guard the panel 2 from contact with the wire harness 8.

According to this configuration, by attaching the bracket 14 to the metal panel 2, the wire harness 8 inside the housing chamber 3 is precedingly brought into contact with the bracket 14 before the panel 2. For this reason, a situation is unlikely to occur in which the wire harness 8 collides with the panel 2 when vibration occurs, and thus the panel 2 is unlikely to be bruised, etc. By simply attaching the bracket 14 to the panel 2, it is possible to suppress the interference of the wire harness 8 to the panel 2. Thus, it is possible to suppress the interference of the wire harness 8 to the panel 2, with a simple configuration.

(2) Coating of the panel 2 is unlikely to peel off, and thus it is possible to make the panel 2 unlikely to rust.

(3) The stamping surface 20 is unlikely to be worn, and thus it is possible to prevent or keep the vehicle body specific information such as the vehicle body number on the stamping surface 20 from becoming visually unrecognizable.

(4) The bracket 14 includes the notch portion 21 that exposes the stamping surface 20 provided on the panel 2. According to this configuration, when the bracket 14 is attached to the panel 2, it is possible to visually recognize the stamping surface 20 of the panel 2 via the notch portion 21.

(5) The bracket 14 includes a plurality of receiving surfaces 22 that support the wire harness 8 such that the wire harness 8 crosses the notch portion 21. According to this configuration, when the notch portion 21 is provided in order to expose the stamping surface 20, the wire harness 8 can be tightly supported by the plurality of receiving surfaces 22 that can be end surfaces of the notch portion 21, for example.

(6) The receiving surfaces 22 include the first receiving surface 23 that comes into contact with one side surface of the wire harness 8, and the second receiving surface 24 that comes into contact with another side surface of the wire harness 8. According to this configuration, the wire harness 8 can be tightly supported by the two surfaces.

(7) The bracket 14 includes the bracket body 15. The first receiving surface 23 and the second receiving surface 24 spread in the plane direction of the bracket body 15 (the Y-Z axis plane in FIG. 4, etc.) so as to be orthogonal to each other. According to this configuration, for example, the wire harness 8 whose routing path extends in an oblique projection can be efficiently brought into contact with the bracket 14.

(8) The bracket 14 includes the fixing portion 26 that is a fixing location to the panel 2. This fixing portion 26 is primarily attached to the panel 2. According to this configuration, when the bracket 14 is attached to the panel 2, the bracket 14 can be tightly fixed to the panel 2 using the fixing portion 26.

(9) The bracket 14 includes the tolerance absorption attachment portion 28 that enables the bracket 14 to be fixed to the panel 2 while absorbing the tolerance of attachment to the panel 2. According to this configuration, when the bracket 14 is attached to the panel 2, the attachment position is flexible, and thus it is possible to improve an operation during attachment.

(10) At least the second surface 19 of the bracket 14 is made of a resin. According to this configuration, it is possible to reduce the friction resistance of the second surface 19 of the bracket 14, and thus the wire harness 8 in contact with the second surface 19 can be made smooth. Thus, a situation can be made unlikely to occur in which the wire harness 8 collides with the second surface 19 of the bracket 14 when vibration occurs.

(11) The wire harness 8 is fixed to the vibration source 4 (in this example, the engine 4a) disposed in the housing chamber 3 and the frame 10 that constitutes the housing chamber 3. The bracket 14 comes into contact with the wire harness 8, at the intermediate position 16c between the first fixing position 16a that is a fixing location to the vibration source 4 and the second fixing position 16b that is a fixing position to the frame 10. According to this configuration, even when the vibration source 4 vibrates, in other words, the engine 4a vibrates in operation and the wire harness 8 vibrates in conjunction with the vibration source 4, the wire harness 8 can be supported by the bracket 14. Thus, there is no need to bring the wire harness 8 into contact with the panel 2.

Note that the following modifications can be made to the present embodiment. The present embodiment and the modifications described below can be combined unless they are technically inconsistent.

The entirety of the first surface 18 may come into contact with the panel 2, or only a portion of the first surface 18 may come into contact with the panel 2.

Only at least a portion of the second surface 19 that comes into contact with the wire harness 8 may be made of a resin.

The notch portion 21 of the bracket 14 may be omitted.

The housing chamber 3 is not limited to the engine room 5, and may be another chamber provided in the vehicle 1.

A plurality of brackets 14 may be provided in one vehicle 1.

There is no limitation to a configuration in which the wire harness 8 is precedingly brought into contact with the bracket 14, and the wire harness 8 may be formed to be sized such that the wire harness 8 comes into contact with the bracket 14 when vibration occurs.

The shape of the bracket 14 is not limited to a shape that includes the edge portion 39 that protrudes by a predetermined amount, and the bracket 14 may be shaped to have a flat surface as a result of the edge portion 39 being omitted, for example.

The first receiving surface 23 and the second receiving surface 24 are not limited to being orthogonal to each other, and may extend in parallel, for example.

The number of receiving surfaces 22 is not limited to two, and may be three or more.

The notch portion 21 may be a hole.

A method for fixing the bracket 14 to the panel 2 is not limited to a configuration in which the fixing portion 26 and the tolerance absorption attachment portion 28 are used, and it is possible to apply various methods such as engaging a clip-like protrusion with a recessed portion of the panel 2, for example.

An elastically deformable rubber may be used for the second surface 19.

The material of the second surface 19 is not limited to a resin, and metal may be used, for example.

One wire harness 8 may be brought into contact with the panel 2 using a plurality of brackets 14.

The bracket 14 is not limited to an onboard bracket, and may be used for another apparatus or device.

The illustrated bracket 14 according to an embodiment may be referenced as a panel protection patch. Illustrated "notch portion 21" according to an embodiment may be referenced as a window for visually recognizing the vehicle body information.

The present disclosure has been described in compliance with working examples, but it is understood that the present disclosure is not limited to the working examples and structures. The present disclosure also encompasses various modifications and changes within an equal scope. In addition, various combinations and aspects as well as other combinations and aspects that additionally include only one element or more elements are included in the category and spirit scope the present disclosure.

The present disclosure encompasses the following embodiments, for example.

(Supplementary Note 1)

A wire harness unit including: a bracket that is attached to a metal panel that forms a housing chamber, and a wire harness that is routed inside the housing chamber, the bracket including: a first surface that is attached to the panel, and a second surface that is positioned on the opposite side to the first surface, and comes into contact with the wire harness in order to guard the panel from contact with the wire harness.

(Supplementary Note 2)

A cable routing unit including: a metal panel that forms a housing chamber, a bracket that is attached to the panel, and a wire harness that is routed inside the housing chamber, the bracket including: a first surface that is attached to the panel, and a second surface that is positioned on the opposite side to the first surface, and guards the panel from contact with the wire harness.

(Supplementary Note 3)

An embodiment of the present disclosure is directed to a panel protection patch (14) that is used with a metal panel (2) having a coated surface and a wire harness (8) disposed close to the coated surface of the metal panel (2), and is configured to protect the coated surface of the metal panel (2), and the panel protection patch (14) can include:

a fixing portion (26) for retrofitting the panel protection patch (14) to the metal panel (2) at a predetermined attachment position of the metal panel (2), and a guard surface (19) configured to come into contact with the wire harness (8) in order to guard the coated surface from repeated contact with the wire harness (8).

(Supplementary Note 4)

In an embodiment of the present disclosure, a metal panel (2) may have a stamping surface (20) on which vehicle body information is stamped, and a panel protection patch (14) may have a window (21) for visually recognizing the vehicle body information that exposes the stamping surface (20) such that the vehicle body information can be visually recognized.

(Supplementary Note 5)

In an embodiment of the present disclosure, the panel protection patch (14) may be a one-piece product made of a synthetic resin.

LIST OF REFERENCE NUMERALS

1 Vehicle
2 Panel
3 Housing chamber
4 Vibration source
4a Engine
5 Engine room
8 Wire harness
9 Attachment
10 Frame
11 First attachment
12 Second attachment
14 Bracket (panel protection patch)
15 Bracket body
16a First fixing position
16b Second fixing position
18 First surface
19 Second surface
20 Stamping surface
21 Notch portion
22 Receiving surface
23 First receiving surface
24 Second receiving surface
26 Fixing portion
27 Hole
28 Tolerance absorption attachment portion
29 Protruding piece
30 Long hole-shaped notch groove
33 Screw shaft
34 Screw shaft
35 Bolt
36 Bolt
39 Edge portion
μ Friction coefficient
W Protruding amount
E Maximum amplitude

What is claimed is:

1. A bracket comprising:
a first surface that is to be attached to a panel that forms at least a portion of a housing chamber;

a second surface that is positioned on an opposite side to the first surface, and comes into contact with a wire harness routed inside the housing chamber, in order to guard the panel from contact with the wire harness; and a notch portion that exposes a stamping surface provided on the panel when the bracket is attached to the panel.

2. The bracket according to claim 1, further comprising a pair of receiving surfaces that support the wire harness such that the wire harness crosses the notch portion.

3. The bracket according to claim 2, wherein the pair of receiving surfaces includes:

a first receiving surface that comes into contact with one side surface of the wire harness, and a second receiving surface that comes into contact with another side surface of the wire harness.

4. The bracket according to claim 3, further comprising a bracket body, wherein the first receiving surface and the second receiving surface extend in a plane direction of the bracket body so as to be orthogonal to each other.

5. The bracket according to claim 1, further comprising a fixing portion that is a fixing location to the panel, and is primarily attached to the panel.

6. The bracket according to claim 1, further comprising a tolerance absorption attachment portion that enables the bracket to be fixed to the panel while absorbing tolerance of attachment to the panel.

7. The bracket according to claim 1, wherein at least the second surface is made of a resin.

8. The bracket according to claim 1, wherein the wire harness is fixed to both a vibration source disposed in the housing chamber and a frame that constitutes the housing chamber, and comes into contact with the wire harness, at an intermediate position between a first fixing position that is a fixing location to the vibration source and a second fixing position that is a fixing position to the frame.

9. A bracket comprising:
a first surface that is to be attached to a panel that forms at least a portion of a housing chamber;

a second surface that is positioned on an opposite side to the first surface, and comes into contact with a wire harness routed inside the housing chamber, in order to guard the panel from contact with the wire harness; and a tolerance absorption attachment portion that enables the bracket to be fixed to the panel while absorbing tolerance of attachment to the panel.

10. A bracket comprising:
a first surface that is to be attached to a panel that forms at least a portion of a housing chamber; and a second surface that is positioned on an opposite side to the first surface, and comes into contact with a wire harness routed inside the housing chamber, in order to guard the panel from contact with the wire harness, wherein the wire harness is fixed to both a vibration source disposed in the housing chamber and a frame that constitutes the housing chamber, and comes into contact with the wire harness, at an intermediate position between a first fixing position that is a fixing location to the vibration source and a second fixing position that is a fixing position to the frame.

* * * * *